(12) United States Patent
Dai et al.

(10) Patent No.: US 9,186,664 B2
(45) Date of Patent: Nov. 17, 2015

(54) INTELLIGENT POST-TREATMENT AND REGENERATION CONTROL METHOD FOR ENGINEERING MACHINERY ENGINE

(75) Inventors: Qinghua Dai, Shanghai (CN); Donghui Cao, Shanghai (CN); Xiangxing Shi, Shanghai (CN)

(73) Assignees: SHANGHAI HUAXING DIGITAL TECHNOLOGY CO., LTD. (CN); SHANGHAI SANY HEAVY MACHINERY LIMITED (CN)

( * ) Notice: Subject to any disclaimer, the term of this patent is extended or adjusted under 35 U.S.C. 154(b) by 0 days.

(21) Appl. No.: 14/348,669

(22) PCT Filed: Apr. 19, 2012

(86) PCT No.: PCT/CN2012/074379
§ 371 (c)(1),
(2), (4) Date: Mar. 31, 2014

(87) PCT Pub. No.: WO2013/067802
PCT Pub. Date: May 16, 2013

(65) Prior Publication Data
US 2014/0228202 A1    Aug. 14, 2014

(30) Foreign Application Priority Data

Nov. 8, 2011   (CN) .......................... 2011 1 0349905

(51) Int. Cl.
*F01N 3/00* (2006.01)
*F01N 3/02* (2006.01)
(Continued)

(52) U.S. Cl.
CPC ............... *B01J 38/02* (2013.01); *E02F 9/2095* (2013.01); *F02D 41/029* (2013.01);
(Continued)

(58) Field of Classification Search
CPC ............ F02D 41/029; F02D 41/0245; F02D 2200/0414; F02D 2200/0802; F02D 2200/0812; F02D 2250/24; F01N 9/002; B01J 38/02

USPC ............................ 60/274, 285, 295, 297, 311
See application file for complete search history.

(56) References Cited

U.S. PATENT DOCUMENTS 7,104,050 B2 *   9/2006   Sato et al. ........................ 60/295
7,181,909 B2 *   2/2007   Sato et al. ........................ 60/297
(Continued)

FOREIGN PATENT DOCUMENTS

CN        201354670 Y       12/2009
WO      2007019712 A1       2/2007
(Continued)

OTHER PUBLICATIONS

International Search Report for PCT/CN2012/074379; International Filing Date: Apr. 19, 2012; Hunan Sany Intelligent Control Equipment Co., Ltd et al.; 4 pgs.

*Primary Examiner* — Binh Q Tran
*Assistant Examiner* — Diem Tran
(74) *Attorney, Agent, or Firm* — Schmeiser, Olsen & Watts, LLP

(57) ABSTRACT

An intelligent post-treatment and regeneration control method for an engineering machinery engine, comprising an automatic and manual regenerated auxiliary load loading control method. The method steps include, when the accumulation of the particles in a diesel particulate filter exceeds a specified standard and the exhaust temperature of the engine is higher than the regeneration required temperature, an engine controller transmits an auxiliary regeneration packet; after receiving the packet, a main controller determines the external environment temperature; the main controller supplies corresponding current for the regeneration electromagnetic valve of the particulate filter according to the obtained external environment temperature and the corresponding relationship between a preset environment temperature and a loading current, so as to obtain a load matching the environment temperature; and the main controller monitors the exhaust temperature at the inlet of the diesel particulate filter catalytic converter to achieve automatic closed-loop control of the regeneration auxiliary loading.

7 Claims, 3 Drawing Sheets

(51) Int. Cl.
- *B01J 38/02* (2006.01)
- *F02D 41/02* (2006.01)
- *E02F 9/20* (2006.01)
- *F01N 9/00* (2006.01)
- *F02D 41/14* (2006.01)

(52) U.S. Cl.
CPC ............ *F02D 41/0245* (2013.01); *F01N 9/002* (2013.01); *F02D 2041/1409* (2013.01); *F02D 2200/0414* (2013.01); *F02D 2200/0802* (2013.01); *F02D 2200/0812* (2013.01); *F02D 2250/24* (2013.01)

(56) References Cited

U.S. PATENT DOCUMENTS

| | | | |
|---|---|---|---|
| 7,430,856 B2 * | 10/2008 | Miyazaki et al. | 60/287 |
| 7,596,942 B2 * | 10/2009 | Colignon | 60/295 |
| 7,685,811 B2 * | 3/2010 | Taylor et al. | 60/277 |
| 8,453,432 B2 * | 6/2013 | Haseyama et al. | 60/286 |
| 8,549,843 B2 * | 10/2013 | Hagio et al. | 60/295 |
| 8,656,707 B2 * | 2/2014 | Oohashi et al. | 60/295 |
| 8,915,067 B2 * | 12/2014 | Oohashi et al. | 60/295 |
| 2005/0050883 A1 * | 3/2005 | Nishimura | 60/286 |
| 2005/0223700 A1 * | 10/2005 | Abe | 60/295 |
| 2007/0017486 A1 | 1/2007 | Wiggins et al. | |
| 2007/0234711 A1 * | 10/2007 | Berke et al. | 60/295 |
| 2008/0098723 A1 * | 5/2008 | Carlill | 60/278 |
| 2009/0019838 A1 | 1/2009 | Marlett | |
| 2009/0082938 A1 * | 3/2009 | Onodera et al. | 701/103 |
| 2009/0301061 A1 | 12/2009 | Sahlen et al. | |
| 2010/0089032 A1 | 4/2010 | Iwashita et al. | |
| 2010/0122522 A1 | 5/2010 | Tsukada et al. | |
| 2010/0180876 A1 | 7/2010 | Leroy et al. | |

FOREIGN PATENT DOCUMENTS

| | | |
|---|---|---|
| WO | 2012122756 A1 | 9/2012 |
| WO | 2013067802 A1 | 5/2013 |

* cited by examiner

INTELLIGENT POST-TREATMENT AND REGENERATION CONTROL METHOD FOR ENGINEERING MACHINERY ENGINE

CROSS-REFERENCE TO RELATED APPLICATIONS

The present application claims the priority of PCT/CN2012/074379 filed on Apr. 19, 2012 which claims priority to Chinese application number 201110349905.6, filed on Nov. 8, 2011, the disclosure of both are herewith incorporated by reference in their entireties.

FIELD OF TECHNOLOGY

The following relates to an intelligent control method, more specifically, to an intelligent post-treatment and regeneration control method for an engineering machinery engine.

BACKGROUND

Nowadays, with the energy saving ideas emerged in the world, the technology of cleansing the exhaust gas is widely used in Euro IV engine for the higher demands of the engine exhaust. When the diesel engine exhaust gas cleansing system is applied to the engineering machineries like excavators, of which disadvantages are as follows: The stop operation has to be performed for the manual regeneration, of which effect is poor and owns low efficiency under the low load loading condition. Chinese Patent Publication NO. CN101737124A discloses an engineering machinery exhaust gas cleansing system, which enables the efficient burning of the particle accumulated on the filter, thus avoiding the decrease of the operating efficiency caused by regeneration control. The system comprises a filter, a regeneration mechanism, a setting mechanism and a regeneration control mechanism. After the setting mechanism presets and stops the, when the machine is informed to goes into the stop status, the controller calculates the time used for the particulate matter accumulated in the filter burning, if the time is longer than the preset time or the stop time, thus making the regeneration control operate. As the DPD regeneration depends on the promotion of exhaust temperature, when the excavator is in the high-load operating state and the exhaust temperature of the engine reaches the regeneration required temperature, the engine control ECM automatically controls DPD to regenerate in this time, when the excavator in light-load operating state or idle state, the exhaust temperature is not high enough, actually it can't reach the regeneration required temperature, thus it need to rely on the hydraulic load auxiliary to promote exhaust temperature; nowadays, in the situation of the low exhaust temperature, it uses two opened-loop methods such as the manual loading load or the value load to operate auxiliary regeneration;

The technical problems comprise:

1. The load loading time is about twenty minutes. The loading load is manually controlled by changing the inlet exhaust temperature of the diesel particulate filter (DPF) catalytic converter, i.e., DOC temperature during the manual load loading process, which leads to the inconveniences for the operators.

2. The loading load can't be adjusted by the determined load loading in accordance with the change of the inlet exhaust temperature of the diesel particulate filter (DPF) catalytic converter, i.e., DOC temperature.

3. The loading load can't be controlled by the manual load loading and the determined load loading in accordance with the external environment temperature since its low intelligent.

SUMMARY

Regarding to the above mentioned problems that the loading load can't be controlled by the manual load loading and the determined load loading in accordance with the external environment temperature, the present invention aims to provide an intelligent post-treatment and regeneration control method for an engineering machinery, which adopts closed-loop control, namely in the process of automatic loading by monitoring the external environment temperature and the diesel oxidation catalyst converter temperature to automatically adjust the size of loading load, achieving the intelligent and precise control of the automatical load loading.

The purpose of the present disclosure is achieved by the following technical schemes: An intelligent post-treatment and regeneration control method for an engineering machinery, wherein it comprises: an automatically regenerated auxiliary load loading control method and a manually regenerated auxiliary load loading control method, wherein:

A. the automatically regenerated auxiliary load loading control method comprises the following steps:

When the accumulation of the particles in a diesel particulate filter exceeds a specified standard and the exhaust temperature of the engine is higher than the regeneration required temperature, an engine controller transmits an auxiliary regeneration packet;

after receiving the packet, a main controller determines the external environment temperature; the main controller supplies corresponding current for the regeneration electromagnetic valve of the particulate filter according to the obtained external environment temperature and the corresponding relationship between a preset environment temperature and a loading current, so as to obtain a load matching the environment temperature; and the main controller monitors the exhaust temperature at the inlet of the diesel particulate filter catalytic converter, when the temperature of the diesel oxidation catalytic converters lower than the lower limit of exhaust temperature of the engine, increasing the current of the regeneration electromagnetic valve of the particulate filter to increase the load, when the temperature of the diesel oxidation catalytic converters higher than the upper limit of exhaust temperature of the engine, decreasing the current of the regeneration electromagnetic valve of the particulate filter to decrease the load, achieving automatic closed-loop control of the regeneration auxiliary loading.

B. A manually regenerated auxiliary load loading control method comprises the following steps: when the main controller monitors the button of the manually regenerated pressed, an engine controller transmits an auxiliary regeneration packet; after receiving the packet, a main controller determines the external environment temperature;

the main controller supplies corresponding current for the regeneration electromagnetic valve of the particulate filter according to the obtained external environment temperature and the corresponding relationship between a preset environment temperature and a loading current, so as to obtain a load matching the environment temperature;

The main controller monitors the temperature, thus, when the temperature of the diesel oxidation catalytic converters lower than the lower limit of exhaust temperature of the engine, increasing the current of the regeneration electromagnetic valve of the particulate filter to increase the load, when the temperature of the diesel oxidation catalytic converters higher than the upper limit of exhaust temperature of the engine, decreasing the current of the regeneration electromagnetic valve of the particulate filter to decrease the load, so as to achieve manual closed-loop control of the regeneration auxiliary loading.

According to the intelligent post-treatment and regeneration control method for an engineering machinery, wherein, the engine controller transmits an auxiliary regeneration packet by CAN bus.

According to the intelligent post-treatment and regeneration control method for an engineering machinery, wherein, the lower limit of the exhaust temperature of the engine is 250° C.

According to the intelligent post-treatment and regeneration control method for an engineering machinery, wherein, the upper limit of the exhaust temperature of the engine is 300° C.

According to the intelligent post-treatment and regeneration control method for an engineering machinery, wherein, the corresponding relationship between a preset environment temperature and a loading current set by the software of the manually regenerated auxiliary load loading control method is similar with the corresponding relationship between a preset environment temperature and a loading current set by the software of the automatic regenerated auxiliary load loading control method.

According to the intelligent post-treatment and regeneration control method for an engineering machinery, wherein, the automatic regenerated auxiliary load loading control method changes the current of the regeneration electromagnetic valve of the particulate filter by controlling the corresponding pulse width modulation signal of the main control, thus controlling different hydraulic load loading.

According to the intelligent post-treatment and regeneration control method for an engineering machinery, wherein, the manual regenerated auxiliary load loading control method changes the current of the regeneration electromagnetic valve of the particulate filter by controlling the corresponding pulse width modulation signal of the main control, achieving different hydraulic load loading.

In comparison with the current technologies, the beneficial effects of the present invention are as follows:

1. the corresponding load can be selected according to the external environment temperature;

2. during the process of the load loading, the engine exhaust temperature remains in the scope of the regeneration required temperature by the closed-loop control, thus enabling the load loading process to be more intelligent and accurate.

BRIEF DESCRIPTIONS

DETAILED DESCRIPTION

The present invention will be further illustrated in combination with the following schematic diagrams and embodiments.

The intelligent post-treatment and regeneration control method for an engineering machinery of the present disclosure comprises an automatically regenerated auxiliary load loading control method and a manually regenerated auxiliary load loading control method. When the manual or automatic regeneration and engine exhaust temperature is below the regeneration required temperature 250° C., the engine controller ECM transmits an auxiliary regeneration packet to the main controller by a CAN bus. Meanwhile if the ban regeneration button is not pressed, after the main controller synthetically determines the external environment temperature and the DOC temperature, DPD regeneration electromagnetic valve is automatically controlled, loading closed-loop control is automatically achieved until the engine controller ECM sends the stop signal of the auxiliary loading and stops loading.

Figure 3:
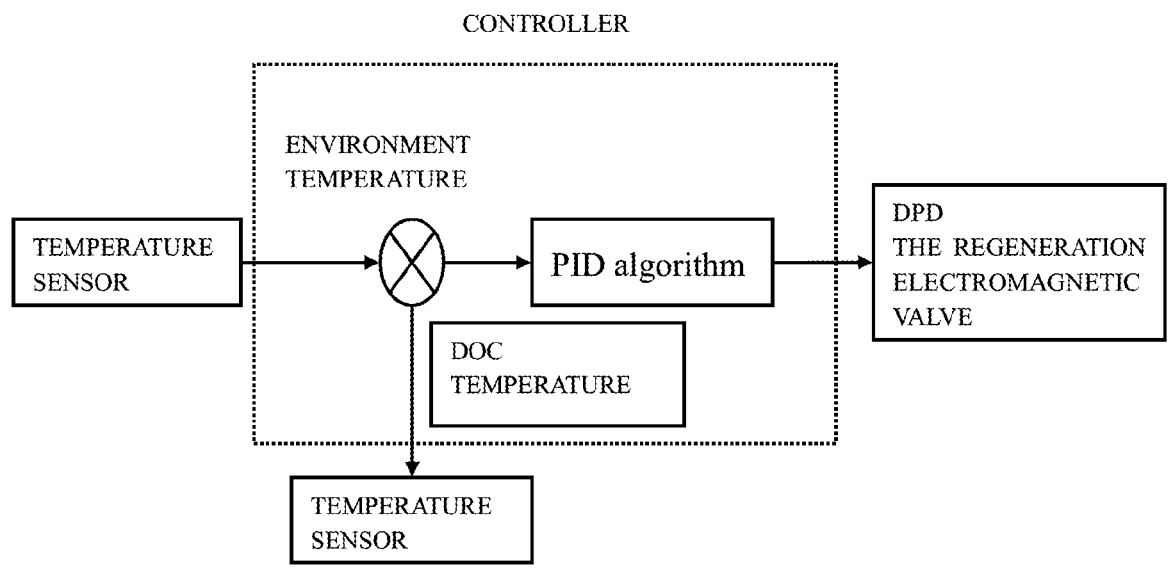
FIG. 3 is a process diagram illustrates the closed-loop control of the automatic load loading of the an intelligent post-treatment and regeneration control method for an engineering machinery.

FIG. 3 is a control diagram which illustrates the closed-loop control of the automatic load loading. The system comprises a control, a DDP, the regeneration electromagnetic valve and a temperature sensor. DPD regeneration electromagnetic valve is used to control the size of auxiliary loading load in automatic and manual regeneration. In one aspect, the lower the environment temperature is, the more loading load is needed. The main controller determines the environment temperature, and the corresponding current for DPD regeneration electromagnetic valve is supplied by PID algorithm, thus loading a load matching the environment temperature. On the other hand, the main controller determines DOC temperature, the regeneration electromagnetic valve is adjusted by PID algorithm, thus the loading load is controlled accurately, load loading is ensured for keeping the DOC temperature in the range of the regeneration required temperature.

Figure 1:
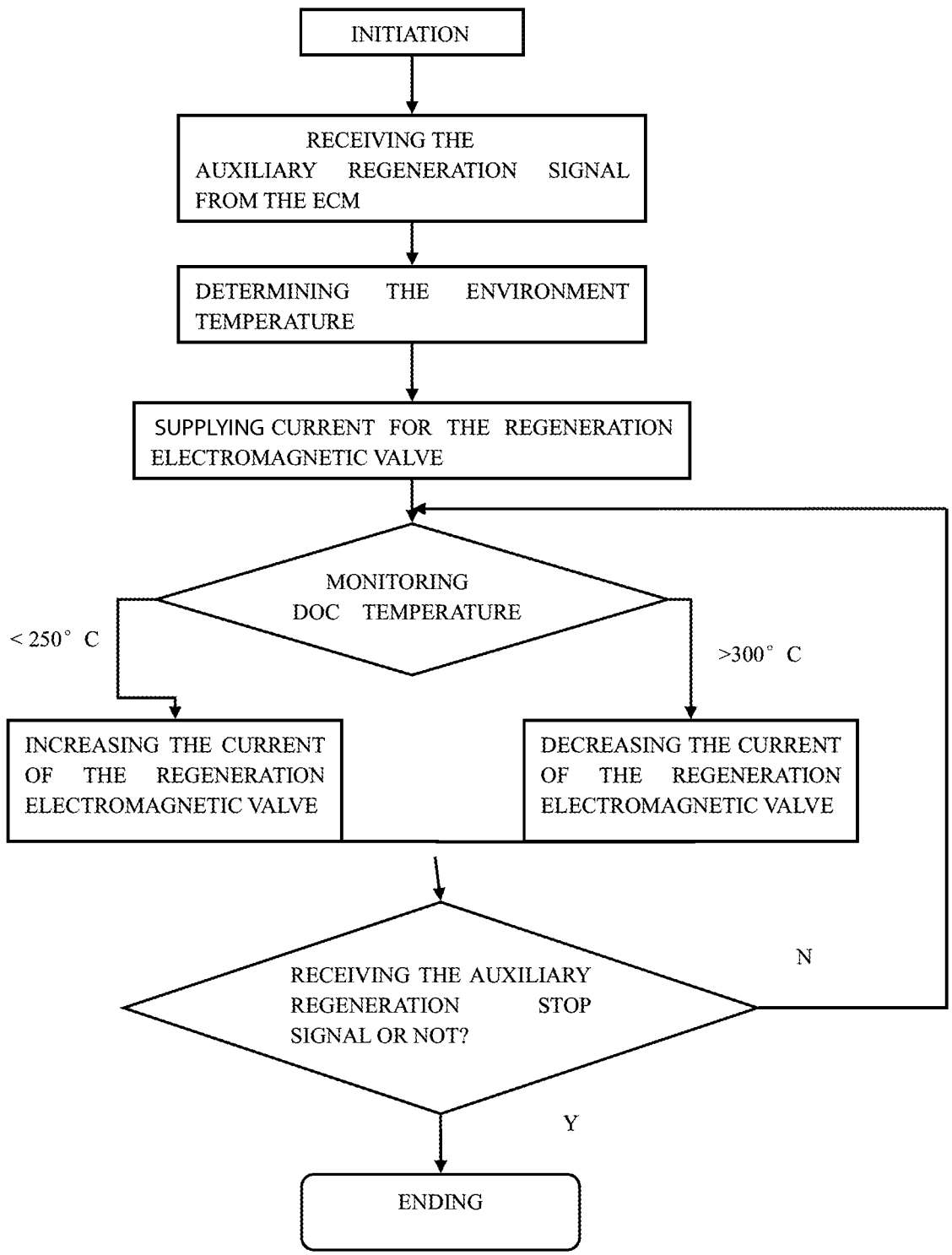
FIG. 1 is a process diagram illustrates the automatically regenerated auxiliary load loading control method of the an intelligent post-treatment and regeneration control method for an engineering machinery.

Meanwhile as referred in FIG. 1 and FIG. 3, the specific process of the automatically regenerated auxiliary load loading control method of the present invention is as follows: During the normal state of the excavator, when the accumulation of the particles in a diesel particulate filter (DPF) exceeds a specified standard, if the exhaust temperature is higher than the regeneration required temperature 250° C., the engine controller comes into automatic regeneration process, the accumulation of the particles is burned in a diesel particulate filter by the regeneration machine; if the exhaust temperature is lower than the regeneration required temperature 250° C., the engine controller transmits an auxiliary regeneration packet to the main controller by a CAN bus, it is required to increase the hydraulic load and the engine exhaust temperature for accomplishing automatic regeneration.

Figure 2:
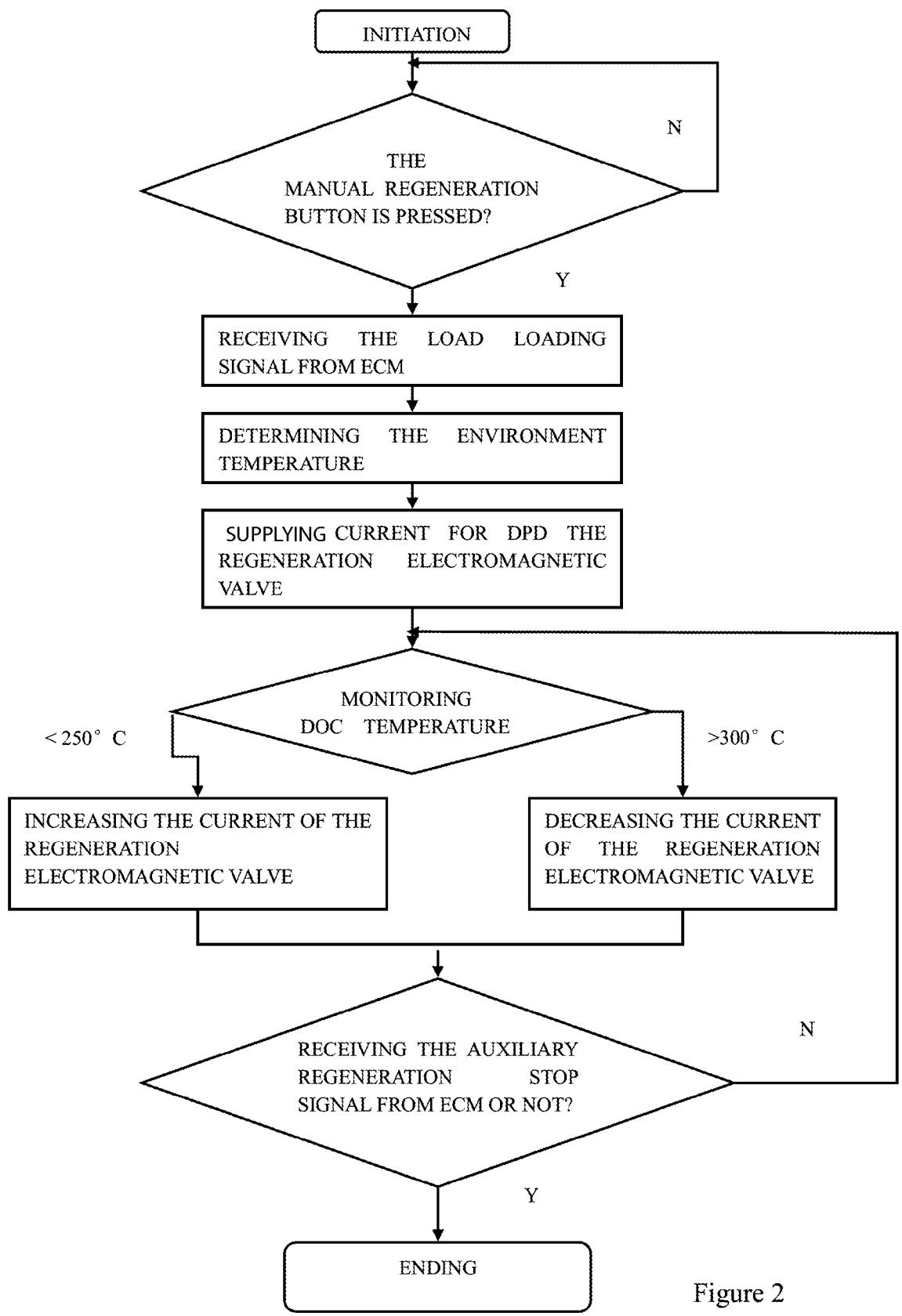
FIG. 2 is a process diagram illustrates the manually regenerated auxiliary load loading control method of the an intelligent post-treatment and regeneration control method for an engineering machinery.

In the process of the automatically regenerated auxiliary loading, DPD regeneration electromagnetic valve is changed by controlling the corresponding PWM signal mouth of the main controller; the automatically regenerated loading control process as disclosed in FIG. 2, when the accumulation of the particles in a diesel particulate filter (DPF) exceeds a specified standard and the exhaust temperature is higher than the regeneration required temperature, the engine controller ECM transmits an auxiliary regeneration packet by a CAN bus. The main controller determines the external environment temperature after receiving the packet from ECM, the external environment temperature is gained by reading the engine inlet temperature, when the environment temperature is high, the required loading load is small, when the environment temperature is low the required loading load is large, the specifically corresponding relationship between them is set by the software of the main controller. The main controller supplies corresponding current for the DPD regeneration electromagnetic valve according to the obtained external environment temperature and the "environmental temperature—loading current" curve set in the software, meanwhile, the main controller monitors DPF catalyst inlet exhaust temperature. AS the engine regeneration required temperature is 250° C.-300° C., thus when the DOC temperature is less than 250° C. the regeneration electromagnetic valve current is asked for increasing so as to increase the loading, and to achieve the automatic closed-loop control of the regeneration auxiliary loading.

Meanwhile as referred in FIG. 2 and FIG. 3, the specific process of the automatically regenerated auxiliary load loading control method of the present invention is as follows:

When the excavator stops working, the operating handle is in the middle, the forerunner lock is locked, the excavator is in the idle state, the engine exhaust temperature is less than the regeneration required temperature (250° C.). The engine controller transmits an auxiliary regeneration packet to the main controller by a CAN bus, it is required to increase the hydraulic load, and the exhaust temperature is kept in the range of the regeneration required temperature by the auxiliary loading for burning the accumulation of the particles in a diesel particulate filter by the manual regeneration function.

The Manual regeneration auxiliary loading process changes the DPD regeneration electromagnetic valve current by the corresponding pulse width modulation signal of the main control, different hydraulic load loading is achieved; the manual regeneration auxiliary loading process is similar with the automatic regeneration loading, as disclosed in FIG. 2, when the main controller monitors the button of the manually regenerated pressed, the displayer transmits an auxiliary regeneration packet by a CAN bus; after receiving the packet from the displayer, a main controller determines the external environment temperature; the external environment temperature is gained by reading the engine inlet temperature, when the environment temperature is high the needed loading load is small, when the environment temperature is low the needed loading load is large. The specifically corresponding relationship between them is set by the software of the main controller, the main controller supplies corresponding current for the DPD regeneration electromagnetic valve according to the obtained external environment temperature and the "environmental temperature—loading current" curve set in the software, so as to obtain a load matching the environment temperature. The curve is similar with the curve used in "environmental temperature—loading current" of the automatic regeneration auxiliary control; meanwhile, the main controller monitors DOC temperature, thus when the DOC temperature is less than 250° C., the DPD regeneration electromagnetic valve current is increased for increasing the loading. When the DOC temperature is more than 300° C., the DPD regeneration electromagnetic valve current is required to be decreased for decreasing the loading, so as to achieve the manual closed-loop control of the regeneration auxiliary loading.

In summary, an intelligent post-treatment and regeneration control method for an engineering machinery engine of the present invention comprises an automatically regenerated auxiliary load loading control method and a manually regenerated auxiliary load loading control method, automatic regeneration auxiliary load loading control method comprises the following steps: when the accumulation of the particles in a diesel particulate filter exceeds a specified standard and the exhaust temperature of the engine is higher than the regeneration required temperature, an engine controller transmits an auxiliary regeneration packet;

After receiving the packet, a main controller determines the external environment temperature.

The main controller supplies corresponding current for the regeneration electromagnetic valve of the particulate filter according to the obtained external environment temperature and the corresponding relationship between a preset environment temperature and a loading current, so as to obtain a load matching the environment temperature.

The present invention can choose the size of the load by the external environment temperature; in the load loading process, the engine exhaust temperature is kept in the range of the regeneration required temperature by the closed-loop control, enabling the load loading process to be more intelligent and accurate.

While the present disclosure has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

The invention claimed is:

1. An intelligent post-treatment and regeneration control method for an engineering machinery engine, comprising:
   an automatically regenerated auxiliary load loading control method and a manually regenerated auxiliary load loading control method, wherein:
   A. the automatic regeneration auxiliary load loading control method comprises the following steps:
   when an accumulation of the particles in a diesel particulate filter exceeds a specified standard and an exhaust temperature of the engine is higher than a regeneration required temperature, an engine controller transmits an auxiliary regeneration packet;
   after receiving the auxiliary regeneration packet, a main controller determines an external environment temperature;
   the main controller supplies corresponding current for a regeneration electromagnetic valve of the diesel particulate filter according to the obtained external environment temperature and the corresponding relationship between a preset environment temperature and a loading current, so as to obtain a load matching the external environment temperature;
   the main controller monitors the exhaust temperature at an inlet of the diesel particulate filter, when a temperature of a diesel oxidation catalytic converters is lower than a lower limit of the engine regeneration required exhaust temperature, the current of the regeneration electromagnetic valve of the diesel particulate filter is raised to increase the load, when the temperature of the diesel oxidation catalytic converter is higher than an upper limit of the engine regeneration required exhaust temperature, the current of the regeneration electromagnetic valve of the diesel particulate filter is declined to decrease the load, so as to achieve the automatic closed-loop control of the regenerated auxiliary loading; and
   B. the manually regenerated auxiliary load loading control method comprises the following steps:
   when the main controller monitors a button of the manually regenerated pressed, an engine controller transmits an auxiliary regeneration packet; after receiving the auxiliary regeneration packet, a main controller determines the external environment temperature;

the main controller supplies corresponding current for the regeneration electromagnetic valve of the diesel particulate filter according to the obtained external environment temperature and the corresponding relationship between a preset environment temperature and a loading current, so as to obtain a load matching the environment temperature;

the main controller monitors the temperature, thus, when the temperature of the diesel oxidation catalytic converter is lower than the engine regeneration required exhaust temperature, increasing the current of the regeneration electromagnetic valve of the diesel particulate filter to increase the load, when the temperature of the diesel oxidation catalytic converter is higher than the upper limit of the engine regeneration required exhaust temperature, the current of the regeneration electromagnetic valve of the diesel particulate filter is declined to decrease the load, so as to achieve the manual closed-loop control of the regenerated auxiliary loading.

2. The intelligent post-treatment and regeneration control method for an engineering machinery engine as disclosed in claim 1, wherein the engine controller transmits an auxiliary regeneration packet by a CAN bus.

3. The intelligent post-treatment and regeneration control method for an engineering machinery engine as disclosed in claim 1, wherein the lower limit of the engine regeneration required exhaust temperature is 250° C.

4. The intelligent post-treatment and regeneration control method for an engineering machinery engine as disclosed in claim 1, wherein the upper limit of the engine regeneration required exhaust temperature is 300° C.

5. The intelligent post-treatment and regeneration control method for an engineering machinery engine as disclosed in claim 1, wherein the corresponding relationship between a preset environment temperature and a loading current set by a software of the manually regenerated auxiliary load loading control method is similar with the corresponding relationship between a preset environment temperature and a loading current set by the software of the automatic regenerated auxiliary load loading control method.

6. The intelligent post-treatment and regeneration control method for an engineering machinery engine as disclosed in claim 1, wherein the automatic regenerated auxiliary load loading control method changes the current of the regeneration electromagnetic valve of the diesel particulate filter by controlling a corresponding pulse width modulation signal of the main control, so as to control different hydraulic load loading.

7. The intelligent post-treatment and regeneration control method for an engineering machinery engine as disclosed in claim 1, wherein the manual regenerated auxiliary load loading control method changes the current of the regeneration electromagnetic valve of the diesel particulate filter by controlling a corresponding pulse width modulation signal of the main control, so as to achieve different hydraulic load loading.

* * * * *